(12) United States Patent
Buescher et al.

(10) Patent No.: US 6,588,660 B1
(45) Date of Patent: Jul. 8, 2003

(54) PASSIVE CONTACTLESS SMARTCARD SECURITY SYSTEM

(75) Inventors: Timothy W. Buescher, Rocklin, CA (US); Douglas L. Manchester, Applegate, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 09/676,021

(22) Filed: Sep. 29, 2000

(51) Int. Cl.[7] .............................. G06K 5/00; G06K 19/06
(52) U.S. Cl. ..................... 235/382; 235/492; 235/380
(58) Field of Search ................... 235/382, 375, 235/492, 487, 491, 380, 384; 340/5.1, 5.2, 5.4–5.42, 5.51–5.6

(56) References Cited

U.S. PATENT DOCUMENTS

| | | | | |
|---|---|---|---|---|
| 5,585,617 A | * | 12/1996 | Ohbuchi et al. | 235/491 |
| 5,640,306 A | | 6/1997 | Gaumet et al. | 361/737 |
| 5,801,367 A | * | 9/1998 | Asplund et al. | 235/384 |
| 5,809,633 A | | 9/1998 | Mundigl et al. | 29/600 |
| 5,892,661 A | | 4/1999 | Stafford et al. | 361/737 |
| 5,943,624 A | | 8/1999 | Fox et al. | 455/556 |
| 6,001,211 A | * | 12/1999 | Hiroyuki | 156/277 |
| 6,257,486 B1 | * | 7/2001 | Teicher et al. | 235/380 |
| 6,424,029 B1 | * | 7/2002 | Giesler | 257/649 |

OTHER PUBLICATIONS

Identification cards—Contactless integrated circuit(s) cards—Proximity cards—ISO/IEC FCD 14443–2 Final Committee Draft(1999).

Identification cards—Contactless integrated circuit(s) cards—Vicinity cards—ISO/IEC FCD 15693–2 Final Committee Draft(1999).

Merkling, R., et al "Smart Card Introduction" Mar. 1994, available at http://www.opengroup.org/rfc/mirror–rfc/rfc57.0.txt.

Cagliostro, C., "Primer on Start Cards," Jan. 10, 2000, available at http://www.scia.org/knowledgebase/about-SmartCards/primer.htm.

\* cited by examiner

Primary Examiner—Michael G. Lee
Assistant Examiner—Jamara A. Franklin (57) ABSTRACT

A method in a contactless smartcard includes providing a contactless smartcard having an operating frequency higher than a specified transmission frequency of contactless smartcards; bringing the contactless smartcard within a detection range of a smartcard reader; activating the contactless smartcard by applying human body capacitance to the contactless smartcard; and deactivating the contactless smartcard by removing the human body capacitance from the contactless smartcard. When thus operated, the contactless smartcard of the present invention is secured against unknown, unintended, and unauthorized interrogations.

45 Claims, 6 Drawing Sheets

PASSIVE CONTACTLESS SMARTCARD SECURITY SYSTEM

BACKGROUND OF THE INVENTION

1. Field of the Invention

The invention generally relates to contactless smartcard technology; and in particular, the present invention relates to a security system for use with contactless smartcards.

2. Background of the Invention

Recent development in and standardization of smartcard technology is driving the wide-spread use of smartcards. Smartcards are credit card-sized plastic cards that contain embedded computer chips. Usually the computer chips are memory chips or microprocessor chips with internal memory. There are two categories of smartcards: contact smartcards or contactless smartcards. A contact smartcard requires physical contact between the computer chip on the card and a smartcard reader to conduct a transaction. Typically, a conductive module is provided on the surface of a contact smartcard for forming electrical contacts with the smartcard reader.

Figure 1:
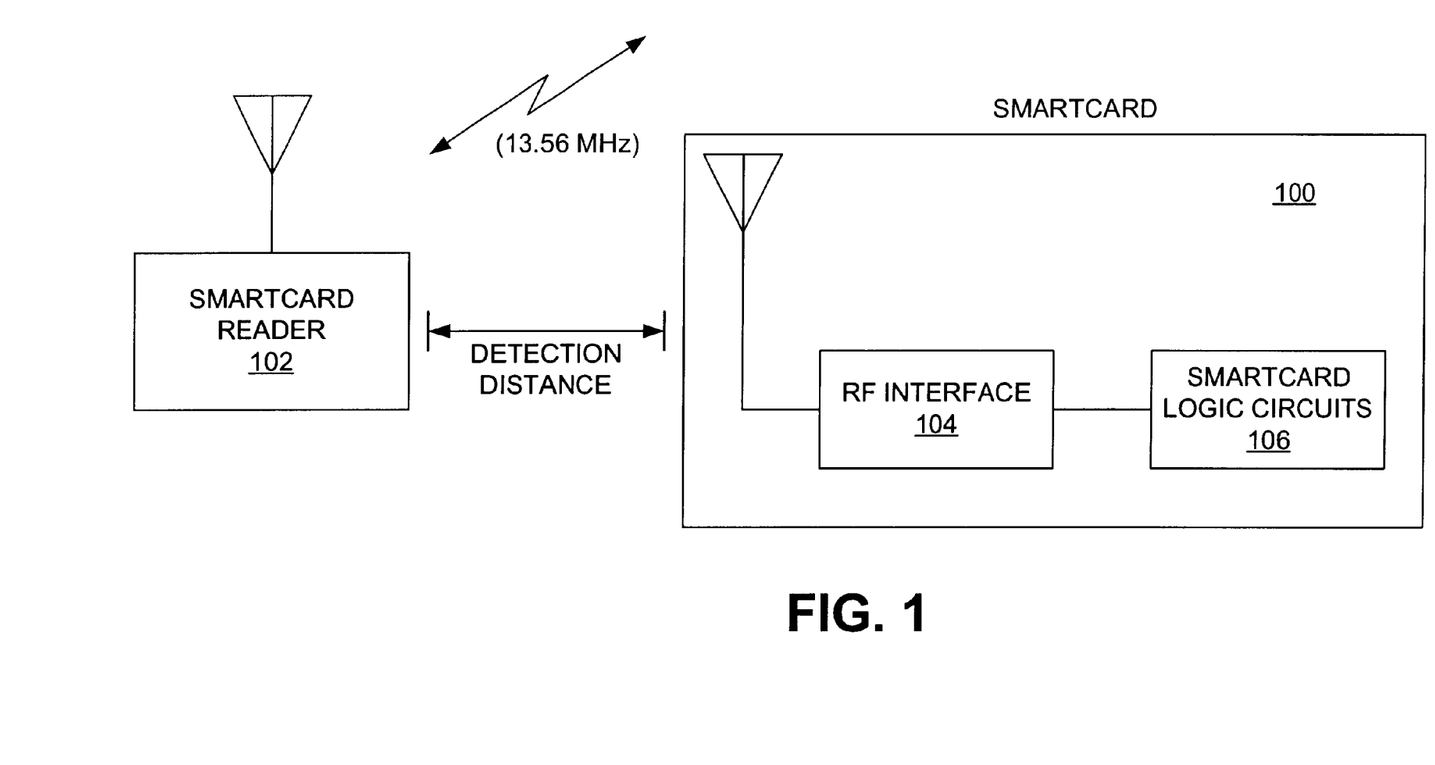
FIG. 1 is a block diagram illustrating the operation of a conventional contactless smartcard and a smartcard reader.

On the other hand, a contactless smartcard communicates with a smartcard reader via an electromagnetic interface when the contactless smartcard is brought in close proximity to the reader. FIG. 1 is a block diagram illustrating the operation of a conventional contactless smartcard and a smartcard reader. A smartcard reader 102 transmits radio frequency (RF) signals over its antenna while a conventional contactless smartcard 100, disposed with its own antenna, detects the RF signals when the card is brought within the detection distance of the reader. The communication frequency for contactless smartcards is set at 13.56 MHz±7 kHz as defined by the ISO/IEC standard nos. 14443-2 and 15693-2, entitled "Identification cards—Contactless integrated circuit(s) cards" for proximity cards and vicinity cards, respectively. In operation, a contactless smartcard derives operating power from the induced electromagnetic field transmitted by the smartcard reader. As shown in FIG. 1, the received signal is processed by RF interface 104 which is then provided to smartcard logic circuits 106 as the power source for the circuits. Smartcard logic circuits 106 are thus activated. Data is conveyed to and from the contactless smartcard through the RF signals transmitted and received by the antenna of the contactless smartcard.

The detection range of contactless smartcards is also defined by the aforementioned ISO standards. For instance, a proximity contactless smartcard has a minimum operating field of 1.5 A/m and a maximum operating field of 7.5 A/m (see ISO standard no. 14443-2). A vicinity card, on the other hand, has a minimum operating field of 150 mA/m and a maximum operating field of 5 A/m (see ISO standard no. 15693-2). Depending on the detection range required for the specific application, a contactless smartcard is constructed to operate within the detection ranges specified above.

Wide array of applications of both contact and contactless smartcards have been identified. For instance, smartcards are used in the financial sector and the health care sector throughout Europe and Asia. Smartcards can be used for storing important cardholder financial information. Smartcards have also been used as "electronic purses" where the smartcards contain cash or other financial information of the cardholders. For example, a smartcard can contain information representing values such as electronic cash that is converted from paper cash or from a bank's ATM. The electronic cash can be used at merchants for purchases, at vending machines, at pay telephones and at mass transit systems.

In some countries, health care programs provide health care smartcards to participants containing medical plan details and medical information of the card holder.

While contactless smartcards offer many advantages over the conventional magnetic strip cards as well as contact smartcards, such as providing a faster interface with card readers, the use of contactless smartcards poses serious security and privacy concerns. Because contactless smartcards is activated merely by bring the cards within the detection range of a card reader, contactless smartcards are susceptible to unauthorized and unknown interrogation. For example, "electronic pick-pocketing" is a security concern particular to contactless smartcards. Electronic pick-pocketing occurs when a contactless smartcard carried by a cardholder in his back pocket or backpack is interrogated by an unauthorized person without the cardholder's knowledge and authorization. A person attempting "electronic pick-pocketing" only needs to bring a card reader sufficiently near the purse or backpack to activate the card. The person is then able to extract information off the card such as cash or valuable personal financial information, such as bank account numbers, during the unauthorized interrogation. The person may also conduct a transaction with the card, unbeknownst to the cardholder. For health care smartcards, the "pick-pocketer" can extract private and confidential health conditions and information about the cardholder.

Therefore, there is a need to secure contactless smartcards against unauthorized interrogations.

SUMMARY OF THE INVENTION

According to the present invention, a method for securing a contactless smartcard against unknown and unauthorized interrogations while the smartcard is being carried on the person of a cardholder is provided. The method includes: (a) providing an operating frequency in the contactless smartcard, the operating frequency being higher than a specified transmission frequency of contactless smartcards; (b) bringing the contactless smartcard within a detection range of a smartcard reader; and (c) maintaining the contactless smartcard in an inactive state as a result of the operating frequency being higher than the specified transmission frequency.

According to another embodiment of the present invention, the method further comprises: (d) applying a human body capacitance to the contactless smartcard, thereby activating the contactless smartcard for intended interrogations with the smartcard reader.

According to another aspect of the present invention, a method in a contactless smartcard is provided including: (a) providing a contactless smartcard having an operating frequency higher than a specified transmission frequency of contactless smartcards; (b) bringing the contactless smartcard within a detection range of a smartcard reader; (c) activating the contactless smartcard by applying human body capacitance to the contactless smartcard; and (d) deactivating the contactless smartcard by removing the human body capacitance from the contactless smartcard.

According to yet another aspect of the present invention, a contactless smartcard includes a first layer of dielectric material having a top surface, a second layer of dielectric material having a bottom surface, the first layer and second layer of dielectric material providing a laminate layer, an electronic circuit, a tuning circuit having an operating frequency, the tuning circuit being electrically coupled to the electronic circuit for providing power to the electronic circuit, and a conductive plate electrically coupled to the tuning circuit. The tuning circuit, the electronic circuit and the conductive plate are disposed between the first layer and the second layer of dielectric material. The operating frequency of the tuning circuit is higher than a specified transmission frequency of contactless smartcards.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

According to the present invention, a contactless smartcard is secured against unknown, unintended and unauthorized interrogations while the smartcard is being carried on the person of a cardholder. In one embodiment, even when a contactless smartcard is brought within the detection range of a smartcard reader, the contactless smartcard is not activated unless the cardholder of the contactless smartcard holds onto to the smartcard using a part of the cardholder's body. For instance, the cardholder needs to apply his/her digit (for example, a thumb or a finger) to the surface of the contactless smartcard while holding the card. The action of applying his/her digit to the smartcard of the present invention activates the smartcard for intended interrogations. When the smartcard is not in use, the cardholder carries the smartcard on his/her person but without physical, bodily contact with the smartcard. When the contactless smartcard of the present invention is thus carried, the contactless smartcard is deactivated and cannot be interrogated even if the card is brought within the detection range of a card reader. In this manner, unknown, unintended and unauthorized interrogations of the contactless smartcard is prevented entirely.

The security system incorporated into the contactless smartcards of the present invention obviates the security concern particular to contactless smartcards, that is, the prevention of casual, unauthorized access to the contactless smartcards. The prevention of "electronic pick-pocketing" is paramount when contactless smartcards are used for financial transactions or in storing personal health care information. Because a contactless smartcard of the present invention prohibits interrogation of the card unless the cardholder is actually holding the card, the danger that an unauthorized person can extract personal financial or health information from the smartcard without the cardholder's knowledge is alleviated.

Figure 2:
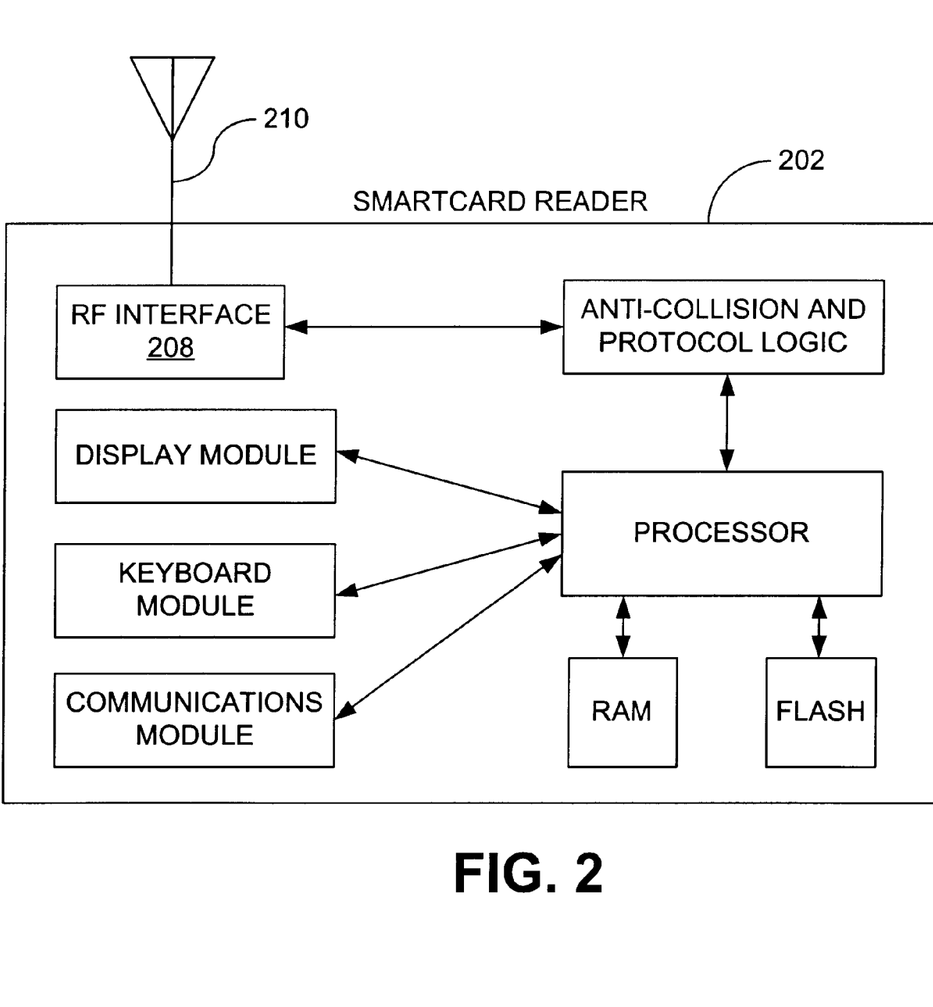
FIG. 2 illustrates a block diagram of an exemplary smartcard reader.

The contactless smartcard of the present invention operates cooperatively with a conventional smartcard reader for carrying out conventional smartcard transactions as shown in FIG. 1. FIG. 2 illustrates a block diagram of an exemplary smartcard reader 202. Of course, the detail configuration of a smartcard reader varies depending on the applications and the exact configuration of the smartcard reader is not important to the present invention. It is sufficient to note that conventional smartcard reader 202 includes a radio frequency (RF) interface 208 coupled to an antenna 210 for transmitting RF signals to contactless smartcards within its detection range. Smartcard reader 202 transmits RF signals at a fixed transmission frequency at a fixed signal level as defined by the ISO standard 14443-2 and 15693-2. As mentioned above, the transmission frequency for contactless smartcards is set at 13.56 MHz±7 kHz.

Figure 3:
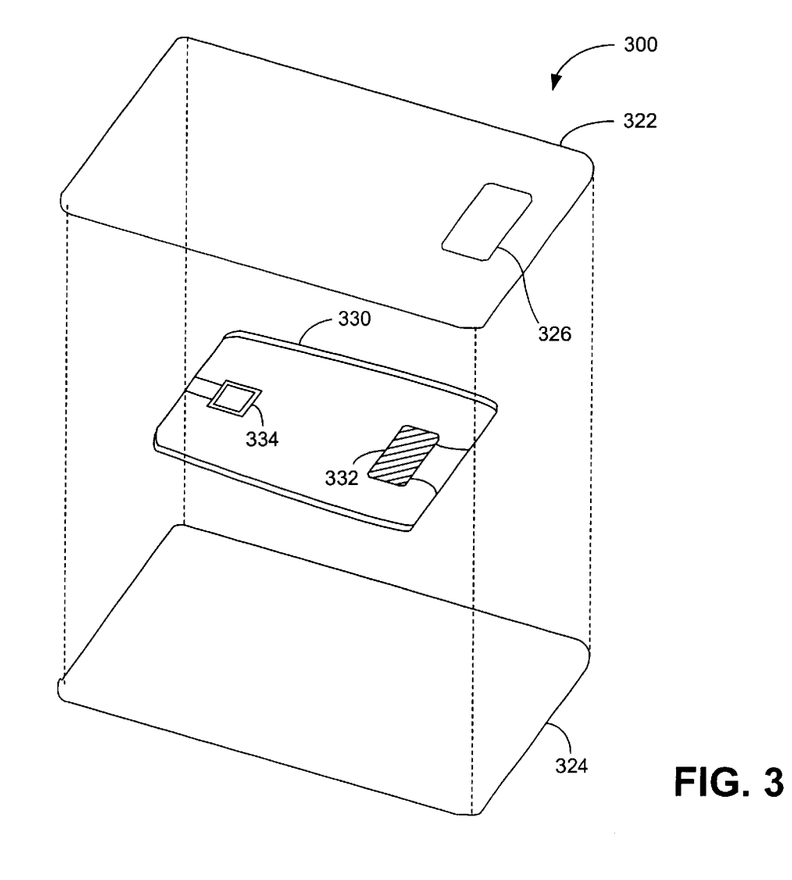
FIG. 3 is an exploded view of a contactless smartcard according to one embodiment of the present invention.

FIG. 3 is an exploded view of a contactless smartcard according to one embodiment of the present invention. Contactless smartcard 300 of the present invention includes a top plastic insulating layer 322 and a bottom plastic insulating layer 324. Top layer 322 and bottom layer 324 encapsulate between them an electronic circuit 334, an antenna coil 330 and a conductive plate 332 to form contactless smartcard 300 of the present invention. Top layer 322 and bottom layer 324 can be made of conventional plastic material and typically is made of polyvinylchloride plastic. When top layer 322 and bottom layer 324 are sealed together to from smartcard 300, the plastic layers protect the internal electronic circuitry from damages due to external elements. In another embodiment, smartcard 300 of the present invention is made to be tamper-resistant.

Figure 4:
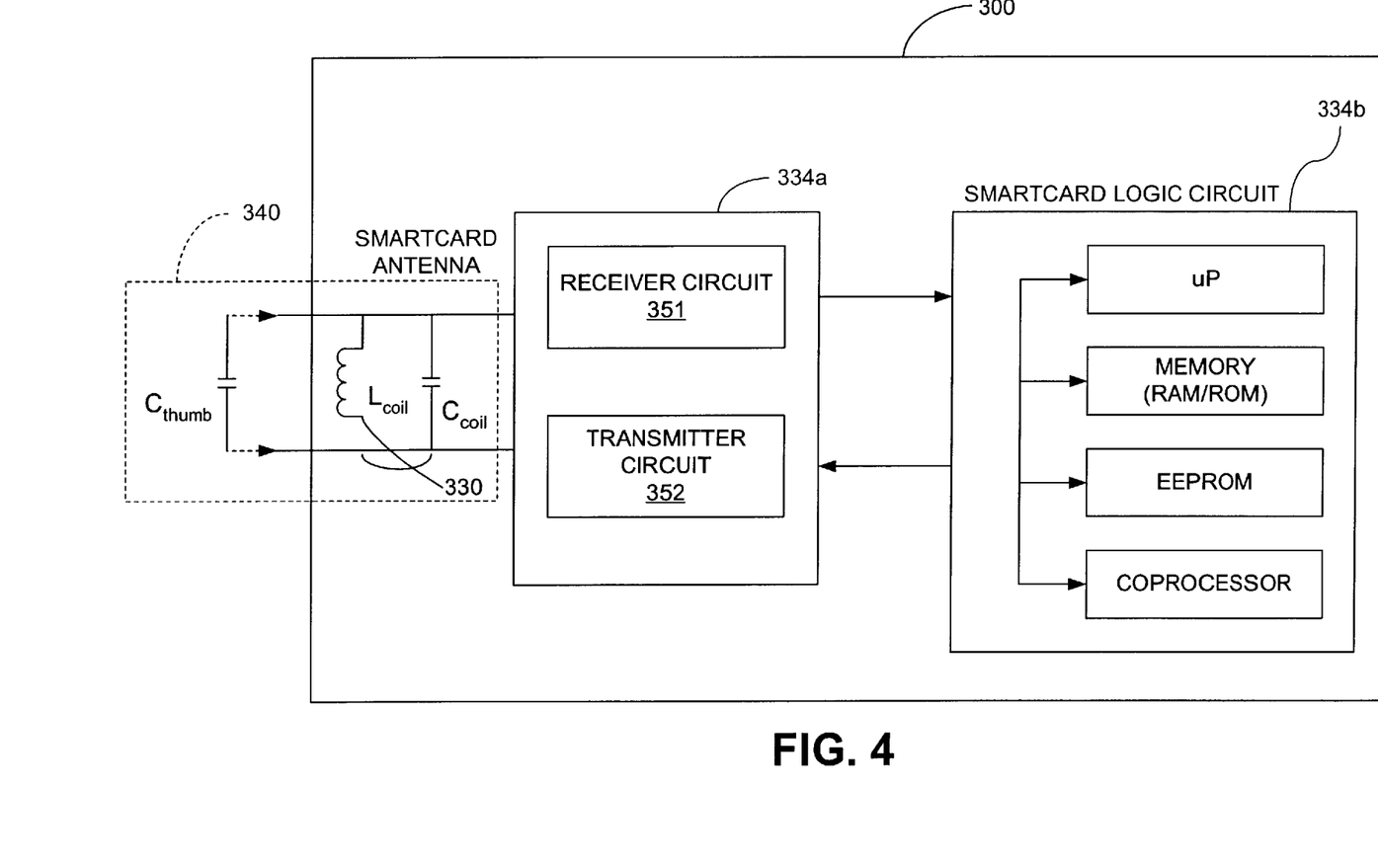
FIG. 4 illustrates a block diagram of the contactless smartcard of FIG. 3 according to one embodiment of the present invention.

Antenna coil 330 of contactless smartcard 300 is a thin wire coil which wraps around the inner perimeter of the smartcard in one or more turns, forming an antenna for detecting the RF transmission from a nearby smartcard reader. Smartcard 300 uses the RF transmission received by antenna coil 300 to energize electronic circuit 334. A representative block diagram of contactless smartcard 300 of FIG. 3 is illustrated in FIG. 4. In FIG. 4, electronic circuit 334 of smartcard 300 includes a smartcard interface circuit 334a and a smartcard logic circuit 334b. Smartcard interface circuit 334a includes a receiver circuit 351 and a transmitter circuit 352 which can be implemented in a conventional manner for receiving RF transmissions from a smartcard reader and for transmitting RF signals to the reader. Smartcard logic circuit 334b can include one or more of a microprocessor, a coprocessor and memory circuits such as RAM, ROM, EEPROM, or Flash memory. Smartcard logic circuit 334b is configured according to the application smartcard 300 is used for.

Antenna coil 330 of smartcard 300 (FIG. 3) forms a tuning circuit for detecting the RF transmissions from a smartcard reader. The equivalent circuit of antenna coil 330 is a parallel connection of an inductor $L_{coil}$ and a capacitor $C_{coil}$ as shown in FIG. 4. Capacitor $C_{coil}$ represents the intrinsic capacitance of antenna coil 330. The tuning circuit of antenna coil 330 has a resonant frequency $f_0$ (also called an operating frequency) given by:

$$f_0 = \frac{1}{2\pi\sqrt{L_{coil}C_{coil}}}.$$

In contactless smartcard 300, the operating frequency $f_0$ of the tuning circuit of antenna coil 330 is set to a value higher than the specified transmission frequency of contactless smartcards. That is, the operating frequency $f_0$ is set to be higher than 13.56 MHz. This is achieved by selecting a capacitance value for capacitor $C_{coil}$ which is smaller than the capacitance necessary to yield an operating frequency $f_0$ of 13.56 MHz according to the equation above. For instance, in one embodiment, the operating frequency $f_0$ is set to a value of at least 10% higher than the 13.56 MHz specified transmission frequency. In an exemplary embodiment, the operating frequency $f_0$ is set to a value greater than or equal to 15 MHz. Of course, one of ordinary skill would appreciate that the lower limit of operating $f_0$ is limited by the quality factor Q of the tuning circuit and that the operating frequency $f_0$ only needs to be high enough so that smartcard 300 of the present invention cannot be activated when brought within the specified transmission frequency of 13.56 MHz±7 kHz for contactless smartcards. In one embodiment, antenna coil 330 is constructed so that an inductance of inductor Lcoil is 700 nH and a capacitance of capacitor Ccoil is 100 pF. The operating frequency of the tuning circuit is approximately 19.02 MHz. Thus, contactless smartcard 300 of the present invention cannot be activated by RF signals, transmitted at 13.56 MHz by a smartcard reader, even when smartcard 300 is brought within the detection range of the reader.

Referring to FIG. 3, the security system of smartcard 300 includes conductive plate 332 disposed between top layer 322 and bottom layer 324 of smartcard 300. Conductive plate 332 is electrically coupled to antenna coil 330. In the present embodiment, conductive plate 332 is coupled to antenna coil 330 through two pieces of thin wires. Of course, other means for electrically coupling conductive plate 332 to antenna coil 330 can be used as well. Top layer 322 includes a contact area 326 which is spatially, directly above conductive plate 332. Contact area 326 is used to indicate on the top surface of smartcard 300 where conductive plate 332 is buried. Contact area 326 can be an area marked with different coloring or different line patterns.

Figure 5:
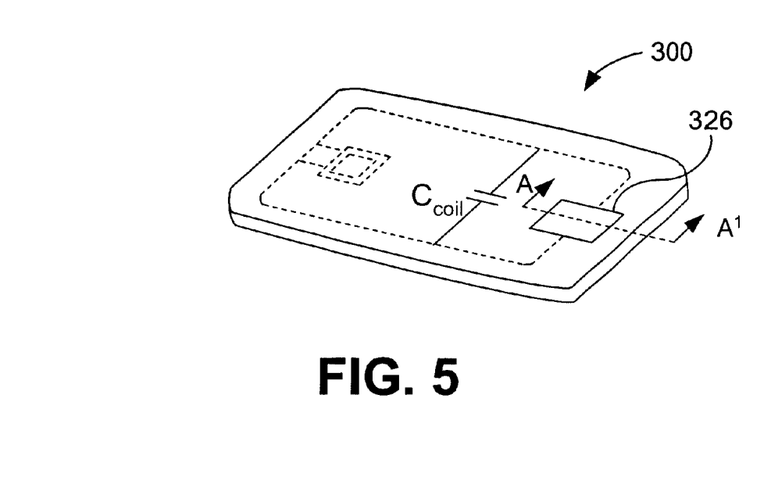
FIG. 5 illustrates a perspective view of a contactless smartcard according to one embodiment of the present invention.

In accordance with the present invention, in order to activate smartcard 300 for intended interrogation, the cardholder or card owner must hold onto contactless smartcard 300. FIG. 5 illustrates a perspective view of contactless smartcard 300 according to one embodiment of the present invention. Contact area 326 delineates the area below which conductive plate 332 lies. In FIG. 5, the dotted line indicates the location of antenna coil 330 and electronic circuit 334 of smartcard 300 which are now encapsulated by top and bottom layers 332 and 324. Capacitor $C_{coil}$, shown in FIG. 5 as connected in parallel to antenna coil 330, represents the effective capacitance of antenna coil 330. No actual discrete capacitor is indeed present. When standing alone, smartcard 300 has an operating frequency higher than the specified transmission frequency for contactless smartcards and thus cannot be activated at all.

Figure 6:
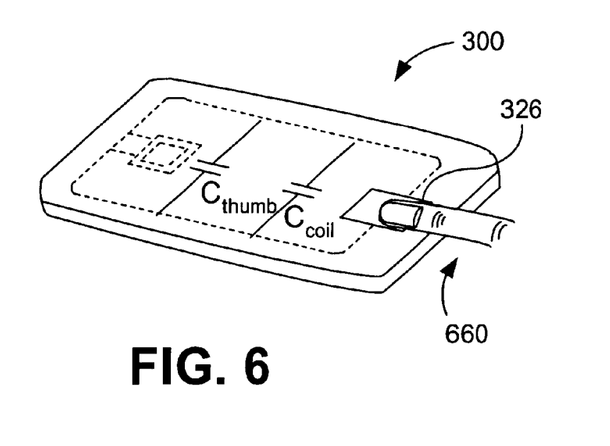
FIG. 6 illustrates a perspective view of a contactless smartcard with a thumb applied to the contact area according to one embodiment of the present invention.

FIG. 6 illustrates the operation of the security system of smartcard 300 of the present invention. To activate smartcard 300, the cardholder holds onto smartcard 300 such as by applying a thumb or a finger to the top surface of the card. Specifically, the cardholder applies the thumb to contact area 326 directly above conductive plate 332. When smartcard 300 is held as shown in FIG. 6, the human body capacitance from the thumb of the cardholder is added to the capacitance of the tuning circuit of antenna coil 330 of smartcard 300. FIG. 6 illustrates the additional capacitance as capacitor $C_{thumb}$ connected in parallel to capacitor $C_{coil}$. In effect, capacitor $C_{thumb}$ is formed between conductive plate 332 buried underneath top plastic layer 322 and thumb 660 of the cardholder. Capacitor $C_{thumb}$ includes capacitance of the plastic layer between the conductive plate and the top surface of the card and the nominal human body capacitance associated with the thumb of the cardholder. In one embodiment, the capacitance of capacitor $C_{thumb}$ is approximately 100 pF. Returning to FIG. 4, when capacitor $C_{thumb}$ is added to the tuning circuit of antenna coil 330 by the action of the cardholder of smartcard 300, capacitor $C_{thumb}$ is added in parallel to capacitor $C_{coil}$. The total effective capacitance of the tuning circuit is increased and the operating frequency of the tuning circuit decreases to match the specified transmission frequency of 13.56 MHz. In one embodiment, when the application of the thumb provides a 100 pF capacitance to the tuning circuit, the operating frequency of the tuning circuit is approximately 13.45 MHz which provides sufficient signal strength for receiver circuit 351 to detect the signal. Then, when the cardholder, holding smartcard 300 as in FIG. 6, brings the card within the detection range of a card reader, smartcard 300 is able to detect the RF signals of the card reader and electronic circuit 334 on smartcard 300 is activated. Therefore, smartcard 300 is protected against unknown, unintended, and unauthorized interrogation by requiring the cardholder to hold onto smartcard 300 for intended transactions. Only when the cardholder holds on to contactless smartcard 300 of the present invention can the smartcard be activated when the card is brought within the detection range of a smartcard reader.

The operation of the contactless smartcard security system of the present invention requires the cardholder of a contactless smartcard to hold onto the smartcard for intended interrogations. Although, typically, the cardholder applies his/her thumb/finger to the card, other ways of making physical contacts to the smartcard are also possible, such as applying the palm of the hand to the surface of the smartcard. It is recognized that the capacitance of the human body has an +/−10% variation across the population. The tuning circuit of antenna coil 330 is constructed to have a quality factor Q sufficient to accommodate variations in the operating frequency due to variation in the human body capacitance between different cardholders. Specifically, the quality factor Q is given by:

$$Q = 2\pi f_0 R_{coil}(C_{coil} + C_{thumb})$$

where $R_{coil}$ is the effective series resistance of antenna coil 330 of smartcard 300. By choosing appropriate values of $R_{coil}$ and $C_{coil}$, the quality factor Q can be selected so as to cover the +/−10% variation in human body capacitance.

Figure 7:
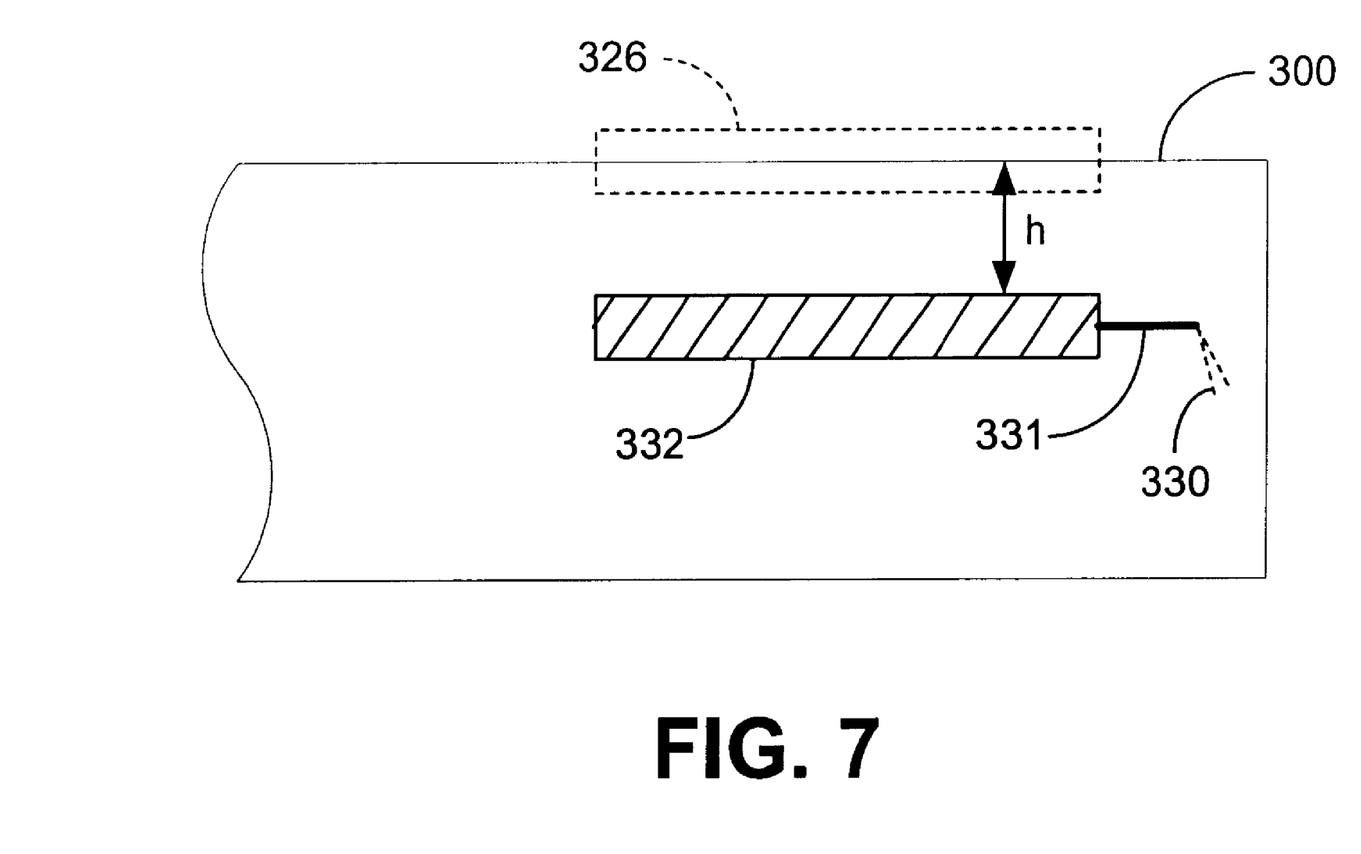
FIG. 7 is a cross-sectional view of contactless smartcard of FIG. 5 along the line A–A'.

FIG. 7 is a cross-sectional view of contactless smartcard 300 of the present invention along the line A–A' in FIG. 5. Conductive plate 332 is buried underneath the plastic material forming the outer surface of smartcard 300. The location of conductive plate 332 relative to the top surface of smartcard 300, i.e. distance h, is not critical. Typically, the vertical distance h is about 0.25 mm. Conductive plate 332 is connected to antenna coil 330 (which is shown extending into the page of FIG. 7) by wire 331. Conductive plate 332 can be made of any metallic or conductive material. In one embodiment, conductive plate 332 is a copper layer having a thickness of about 25.4 $\mu$m or about 0.001 inch as found on typical printed circuit boards.

In the present embodiment, conductive plate 332 covers only a small area of smartcard 300. The size of conductive plate and the corresponding size of contact area 326 only need to be large enough to allow convenient placement of the cardholder's finger or thumb on the surface of smartcard 300 for coupling the body (thumb) capacitance to the tuning circuit of the card. For example, the size of conductive plate 332 and the corresponding size of contact area 326 can be around 3 cm by 3 cm. In another embodiment, the conductive plate of the contactless smartcard of the present invention is made to cover the entire surface of the smartcard so that the entire surface is made available for physical contact by the cardholder for establishing the human body capacitance with the conductive plate.

In accordance with another embodiment of the present invention, the contactless smartcard security system of the present invention can be applied to smartcard constructions other than a credit-card type smartcard. For example, the security system of the present invention can be applied to a key fob smartcard. For example, a key fob smartcard is used at gas pumps for transmitting an authorization code to a gas pump, thus authorizing a gasoline purchase transaction. The security system can be applied to such a key fob smartcard which requires the owner of the key fob to hold onto the key for the authorization to take place. Otherwise, a key fob stored in the pocket of the owner and not making physical contact with the owner cannot be activated.

The above detailed descriptions are provided to illustrate specific embodiments of the present invention and are not intended to be limiting. Numerous modifications and variations within the scope of the present invention are possible. For example, the contact area on the surface of the smartcard can be placed on the bottom surface instead of the top surface. The present invention is defined by the appended claims.

We claim:

1. A method for securing a contactless smartcard against unknown and unauthorized interrogations while said smartcard is being carried by a cardholder, comprising:
   providing an operating frequency in said contactless smartcard, said operating frequency being higher than a specified transmission frequency of contactless smartcards;
   bringing said contactless smartcard within a detection range of a smartcard reader;
   maintaining said contactless smartcard in an inactive state as a result of said operating frequency being higher than said specified transmission frequency; and
   applying a human body capacitance to said contactless smartcard, thereby activating said contactless smartcard for intended interrogations with said smartcard reader.

2. The method of claim 1, wherein said applying a human body capacitance causes said operating frequency of said smartcard to decrease to match said specified transmission frequency, thereby activating said contactless smartcard.

3. The method of claim 2, wherein said operating frequency is at least 10% higher than said specified transmission frequency.

4. The method of claim 2, wherein said specified transmission frequency is 13.56 MHz and said operating frequency is at least 15 MHz.

5. The method of claim 1, wherein said applying a human body capacitance to said contactless smartcard comprises:
   placing a digit of said cardholder on a surface of said contactless smartcard, said human body capacitance being a capacitance of said digit.

6. The method of claim 5, wherein said surface is a top surface of said contactless smartcard.

7. The method of claim 5, wherein said surface is a bottom surface of said contactless smartcard.

8. The method of claim 5, wherein said placing a digit of said cardholder on a surface of said contactless smartcard comprises:
   placing said digit in a designated area on said surface of said contactless smartcard.

9. The method of claim 8, wherein said designated area is about 3 cm by 3 cm in dimensions.

10. The method of claim 8, wherein said designated area covers substantially the entire surface area of said contactless smartcard.

11. The method of claim 1, wherein said providing an operating frequency in said contactless smartcard comprises:
    providing a tuning circuit in said contactless smartcard, said turning circuit electrically coupled to an electronic circuit for providing power to said electronic circuit, said tuning circuit having a resonance frequency higher than said specified transmission frequency, said resonance frequency being said operating frequency of said contactless smartcard; and
    providing a conductive plate in said contactless smartcard, said conductive plate being electrically coupled to said tuning circuit.

12. The method of claim 11, wherein said providing a tuning circuit comprises:
    providing an antenna coil, said antenna coil having an inductance and a capacitance for setting said resonance frequency, and said conductive plate being electrically coupled to said antenna coil.

13. The method of claim 12, wherein said providing an antenna coil comprises:
    providing a thin wire wrapped in one or more turns inside said contactless smartcard.

14. The method of claim 12, further comprising:
    applying a human body capacitance to said contactless smartcard, thereby activating said contactless smartcard for intended interrogations with said smartcard reader.

15. The method of claim 14, wherein said applying a human body capacitance comprises:
    adding said human body capacitance to said capacitance of said antenna coil in said contactless smartcard, thereby decreasing said resonance frequency of said tuning circuit to match said specified transmission frequency.

16. The method of claim 15, wherein said applying a human body capacitance further comprises:
    placing a digit of said cardholder on a surface of said contactless smartcard, thereby adding said human body capacitance to said capacitance of said antenna coil;
    wherein said human body capacitance is a capacitance of said digit.

17. The method of claim 16, wherein said surface is a top surface of said contactless smartcard.

18. The method of claim 16, wherein said surface is a bottom surface of said contactless smartcard.

19. The method of claim 16, wherein said placing a digit of said cardholder on a surface of said contactless smartcard comprises:
    placing said digit in a designated area on said surface of said contactless smartcard.

20. The method of claim 19, wherein said designated area is about 3 cm by 3 cm in dimensions.

21. The method of claim 19, wherein said designated area covers substantially the entire surface area of said contactless smartcard.

22. The method of claim 15, wherein said operating frequency is at least 10% higher than said specified transmission frequency.

23. The method of claim 15, wherein said specified transmission frequency is 13.56 MHz and said operating frequency is at least 14 MHz.

24. The method of claim 15, wherein said antenna coil has an inductance of 700 nH and a capacitance of 100 pF, and said human body capacitance is a capacitance of a digit and is about 100 pF.

25. A method in a contactless smartcard, comprising:
providing a contactless smartcard having an operating frequency higher than a specified transmission frequency of contactless smartcards;
bringing said contactless smartcard within a detection range of a smartcard reader;
activating said contactless smartcard by applying human body capacitance to said contactless smartcard; wherein applying human body capacitance causes said operating frequency of said smartcard to decrease to match said specified transmission frequency, thereby activating said contactless smartcard; and
deactivating said contactless smartcard by removing said human body capacitance from said contactless smartcard.

26. The method of claim 25, wherein said applying human body capacitance comprises:
placing a digit of a cardholder on a surface of said contactless smartcard, said human body capacitance being a capacitance of said digit.

27. The method of claim 25, wherein said operating frequency is at least 10% higher than said specified transmission frequency.

28. The method of claim 25, wherein said specified transmission frequency is 13.56 MHz and said operating frequency is at least 15 MHz.

29. A contactless smartcard, comprising:
a first layer of dielectric material having a bottom surface;
a second layer of dielectric material having a bottom surface;
said first layer and second layer of dielectric material providing a laminate layer;
an electronic circuit;
a tuning circuit having an operating frequency, said tuning circuit being electrically coupled to said electronic circuit for providing power to said electronic circuit;
a conductive plate electronically coupled to said tuning circuit and having a first area;
wherein said tuning circuit, said electronic circuit, and said conductive plate are disposed between said first layer and said second layer of dielectric material;
wherein said operating frequency of said tuning circuit is higher than a specified transmission frequency of contactless smartcards; and
wherein when a human body capacitance is applied to said contactless smartcard, said operating frequency of said tuning circuit decreases to match said specified transmission frequency, thereby activating said contactless smartcard when said contactless smartcard is brought within a detection range of a smartcard reader.

30. The contactless smartcard of claim 29, wherein the value of said operating frequency of said tuning circuit inhibits said contactless smartcard from being activated when said contactless smartcard is brought within a detection range of a smartcard reader.

31. The contactless smartcard of claim 30, wherein said operating frequency is at least 10% higher than said specified transmission frequency.

32. The contactless smartcard of claim 30, wherein said specified transmission frequency is 13.56 MHz and said operating frequency is at least 15 MHz.

33. The contactless smartcard of claim 29, wherein said tuning circuit comprises:
an antenna coil having an inductance and a capacitance for setting a resonance frequency, said resonance frequency being said operating frequency of said tuning circuit.

34. The contactless smartcard of claim 33, wherein said human body capacitance is added to said capacitance of said antenna coil to cause said resonance frequency of said antenna coil to decrease to match said specified transmission frequency.

35. The contactless smartcard of claim 33, wherein said antenna coil has an inductance of 700 nH and a capacitance of 100 pF, and said human body capacitance is a capacitance of a digit and is about 100 pF.

36. The contactless smartcard of claim 29, wherein said operating frequency is at least 10% higher than said specified transmission frequency.

37. The contactless smartcard of claim 29, wherein said specified transmission frequency is 13.56 MHz and said operating frequency is at least 15 MHz.

38. The contactless smartcard of claim 29, further comprises:
a contact area on said top surface of said first layer, said contact area being directly above said conductive plate and having an area substantially equal to said first area of said conductive plate.

39. The contactless smartcard of claim 38, wherein said human body capacitance is applied to said contactless smartcard by placing a digit on said contact area.

40. The contactless smartcard of claim 38, wherein said first area is about 3 cm by 3 cm in dimension.

41. The contactless smartcard of claim 38, wherein said first area covers substantially the entire surface area of said first layer.

42. The contactless smartcard of claim 29, further comprises:
a contact area on said bottom surface of said second layer, said contact area being directly below said conductive plate and having an area substantially equal to said first area of said conductive plate.

43. The contactless smartcard of claim 42, wherein said human body capacitance is applied to said contactless smartcard by placing a digit on said contact area.

44. The contactless smartcard of claim 42, wherein said first area is about 3 cm by 3 cm in dimension.

45. The contactless smartcard of claim 42, wherein said first area covers substantially the entire surface area of said second layer.

* * * * *

UNITED STATES PATENT AND TRADEMARK OFFICE
CERTIFICATE OF CORRECTION

PATENT NO. : 6,588,660 B1
DATED : July 8, 2003
INVENTOR(S) : Timothy W. Buescher et al.

It is certified that error appears in the above-identified patent and that said Letters Patent is hereby corrected as shown below:

Column 9,
Line 3, delete "14" and insert therefor -- 15 --

Signed and Sealed this

Fifth Day of April, 2005

JON W. DUDAS
*Director of the United States Patent and Trademark Office*